US012559637B2

(12) United States Patent
Mizoguchi et al.

(10) Patent No.: US 12,559,637 B2
(45) Date of Patent: Feb. 24, 2026

(54) COLORING TABLET AND WATER-BASED INK COMPOSITION FOR WRITING INSTRUMENT USING THE SAME

(71) Applicant: MITSUBISHI PENCIL COMPANY, LIMITED, Tokyo (JP)

(72) Inventors: Tatsuya Mizoguchi, Tokyo (JP); Takayuki Ikai, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 766 days.

(21) Appl. No.: 17/817,498

(22) Filed: Aug. 4, 2022

(65) Prior Publication Data

US 2023/0072944 A1 Mar. 9, 2023

(30) Foreign Application Priority Data

Aug. 24, 2021 (JP) ................................. 2021-136476
Jun. 30, 2022 (JP) ................................. 2022-106403

(51) Int. Cl.
| | |
|---|---|
| *C09D 11/17* | (2014.01) |
| *C09B 67/20* | (2006.01) |
| *C09D 7/80* | (2018.01) |
| *C09D 11/18* | (2006.01) |

(52) U.S. Cl.
CPC .......... *C09D 11/17* (2013.01); *C09B 67/0063* (2013.01); *C09D 7/80* (2018.01); *C09D 11/18* (2013.01)

(58) Field of Classification Search
CPC ............ C09D 11/17; C09D 7/80; C09D 11/18
USPC ......................................................... 523/161
See application file for complete search history.

(56) References Cited

U.S. PATENT DOCUMENTS

| | | | |
|---|---|---|---|
| 5,990,201 A | 11/1999 | Miyazaki et al. | |
| 6,261,351 B1 | 7/2001 | Miyamoto et al. | |
| 6,776,829 B2 | 8/2004 | Miyamoto et al. | |
| 7,279,512 B2 | 10/2007 | Iwamoto et al. | |
| 2003/0196568 A1* | 10/2003 | Miyamoto ............. | C09D 11/16 106/31.89 |
| 2005/0043439 A1 | 2/2005 | Iwamoto et al. | |

FOREIGN PATENT DOCUMENTS

| | | | | |
|---|---|---|---|---|
| EP | 1 036 833 A1 | 9/2000 | | |
| EP | 1 457 537 A1 | 9/2004 | | |
| GB | 2 379 222 A | 3/2003 | | |
| JP | 2000-281955 A | 10/2000 | | |
| JP | 2005-271365 A | 10/2005 | | |
| JP | 2006-77226 A | 3/2006 | | |
| JP | 2006-175730 A | 7/2006 | | |
| JP | 2013-28691 A | 2/2013 | | |
| KR | 10-0758710 B1 | 9/2007 | | |
| WO | WO-2019007922 A1 * | 1/2019 | ......... | C09B 67/0002 |
| WO | WO 2020/229183 A1 | 11/2020 | | |

OTHER PUBLICATIONS

Extended European Search Report issued Mar. 9, 2023 in European Patent Application No. 22189249.0, 3 pages.

* cited by examiner

*Primary Examiner* — Deve V Hall
(74) *Attorney, Agent, or Firm* — Oblon, McClelland, Maier & Neustadt, L.L.P.

(57) ABSTRACT

A coloring tablet may have excellent solubility and redispersibility and a water-based ink composition for a writing instrument. Such a coloring tablet may contain at least a colorant and a dispersing agent. The dispersing agent may include a hydroxide neutralization product of an (meth) acrylic resin, a hydroxide neutralization product of a styrene-maleic acid copolymer resin, a polyoxyethylene-based surfactant, an alkyl condensed ring sulfonate, an amine ethylene oxide propylene oxide adduct, and/or a isobutylene-based polymer.

20 Claims, No Drawings

COLORING TABLET AND WATER-BASED INK COMPOSITION FOR WRITING INSTRUMENT USING THE SAME

CROSS-REFERENCE TO RELATED APPLICATIONS

The present application claims the benefit of the filing date of Japanese Appl. No. 2021-136476 and 2022-106403, respectively filed on Aug. 24, 2021, and Jun. 30, 2022, the content of each of which is incorporated by reference.

BACKGROUND OF INVENTION

Field of Invention

The present invention relates to a coloring tablet having excellent solubility and redispersibility, and a water-based ink composition for a writing instrument using the same.

Description of Related Art

It is known that colorants in powder form are used for ink compositions by dissolving the colorants in a medium such as water and a liquid for ink when performing writing, and/or a painting and calligraphic work, and the like.

For example, the following ink compositions have been known.

1) A painting and calligraphic work material, such as Indian ink, is characterized by containing particles formed of a water-soluble resin containing an organic and/or inorganic colorant, or, a powder-like particles of aggregation of a large number of particles collectively aggregated (see Patent Document 1).

2) An ink for a writing instrument, and a writing instrument using the same, the ink is characterized by comprising containing a colorant pellet, a colorant pellet prepared by mixing a carbonate, an organic acid, saccharides and a coloring material and hardening them by pressure, a mixing solvent which dissolves the colorant pellet, a resin, and an additive, wherein the colorant pellet and the mixed solvent are reacted at the time of use of the ink (see Patent Document 2).

3) A writing instrument is characterized by containing a liquid for ink that is stored in a state where a colorant to be added to the liquid for ink has not been added, and the colorant is added to the liquid for ink at the start of using the writing instrument and forming a coloring ink (see Patent Document 3).

4) A writing instrument is characterized by containing a liquid for ink that is stored in a state where a colorant to be added to the liquid for ink has not been added, and the colorant is added to the liquid for ink at the start of using the writing instrument and being fed to a writing instrument tip; the writing instrument includes a liquid container for ink for storing the liquid for ink, a colorant container that stores the colorant, a separating means that cuts the connection between the liquid container for ink and the colorant container, and a separation breaking means that connects the liquid container for ink and the colorant container by removing this separating means; and in a state where connection between the colorant container and the liquid container for ink is separated, an inside of the colorant container is maintained to have a negative pressure with respect to a pressure of an inside of the liquid container for ink (see Patent Document 4).

However, the painting and calligraphic work material such as Indian ink of Patent Document 1 described above has a problem that the solubility is insufficient and the coloring material is limited to black such as India ink, while a particle formed of a coloring material such as carbon black contained in a water-soluble resin such as polyvinyl alcohol is used by dissolving in water, for example.

The ink for a writing instrument of Patent Document 2 described above has a problem that added amounts of other components that are necessary for the ink for a writing instrument may be affected and the coloring material to be used is limited to food dye, while the ink is prepared by reacting the colorant pellet and the mixed solvent at the time of use of the ink, or it enhances solubility of the pellet by disintegrating it when a carbonic acid gas is generated (bubbling force) by reacting the carbonate contained in the colorant pellet with an organic acid in water.

With these technologies behind, the emergence of a coloring tablet having superior solubility and redispersibility and a water-based ink composition for a writing instrument is desired.

Patent Document 1: JP 2000-281955 A (Claims, Examples, etc.)

Patent Document 2: JP 2006-077226 A (Claims, Examples, etc.)

Patent Document 3: JP 2005-271365 A (Claims, Examples, etc.)

Patent Document 4: JP 2006-175730 A (Claims, Examples, etc.)

SUMMARY OF INVENTION

In light of the issues of known technologies described above and the current circumstances, the present invention is to solve such issues. An object of the present invention is to provide a coloring tablet having excellent solubility and redispersibility and a water-based ink composition for a writing instrument.

As a result of intensive studies in light of the above-mentioned issues and the like, the present inventors have found that, by forming a coloring tablet at least containing a colorant and a specific dispersing agent, the target coloring tablet described above and a water-based ink composition for a writing instrument using such a coloring tablet can be obtained, and thus has completed the present invention.

That is, the coloring tablet of the present invention contains at least a colorant and a dispersing agent selected from the following Group A:

Group A: a hydroxide neutralization product of an (meth) acrylic resin, a hydroxide neutralization product of a styrene-maleic acid copolymer resin, a polyoxyethylene-based nonionic surfactant, an alkyl condensed ring sulfonate, an amine ethylene oxide (EO) propylene oxide (PO) adduct, and an isobutylene-based polymer.

A mass ratio $[(C)/(A)]$, in which a mass of the colorant is (C) and a mass of the dispersing agent is (A), is preferably 0.5 to 10.

The coloring tablet preferably contains at least one of reinforcing materials selected from the following Group B:

Group B: a polyvinyl alcohol, a modified polyvinyl alcohol, polyvinylpyrrolidone, glycine betaine, urea, a sugar alcohol, latex, a polysaccharide, and a cellulose and a titanium oxide.

The hardness of the coloring tablet is preferably 0.02 kgf to 6.0 kgf.

The water-based ink composition for a writing instrument of the present invention is prepared by allowing the coloring tablet having the composition described above to dissolve or disperse in a liquid for ink that is a solvent.

According to the present invention, a coloring tablet having excellent solubility and redispersibility and a water-based ink composition for a writing instrument using the same are provided.

More specifically, a water-based ink composition for a writing instrument, which has superior solubility and redispersibility, is prepared by allowing the coloring tablet having the composition described above to dissolve or disperse in a liquid for ink that is a solvent. The water-based ink composition can be provided with any color or concealing ability. The prepared water-based ink composition can be filled in a conventional writing instrument such as a storage of a marking-pen or a refill of a ball-point pen, and provided for use.

DETAILED DESCRIPTION OF INVENTION

The object and effects of the present invention can be recognized and obtained especially by using the components and combination indicated in the claims. Both of general explanation described above and detailed explanation described below are exemplification and explanation and do not limit the present invention described in Claims.

An embodiment of the present invention is described below in detail. However, note that the technical scope of the present invention is not limited to the embodiments described below and includes the invention described in Claims and equivalents thereof.

The coloring tablet of the present invention contains at least a colorant and a dispersing agent selected from the following Group A.

Group A: hydroxide neutralization products of (meth) acrylic resins, hydroxide neutralization products of styrene-maleic acid copolymer resins, polyoxyethylene-based surfactants, alkyl condensed ring sulfonates, amine ethylene oxide (EO) propylene oxide (PO) adducts, and isobutylene-based polymers.

As the colorant to be used in the coloring tablet of the present invention, for example, any dyes that dissolve or disperse in water, known inorganic and organic pigment systems such as titanium oxide, resin particle pigments containing pigments, pseudo-pigments obtained by coloring a resin emulsion with a dye, white plastic pigments, pigments obtained by using silica or mica as a base material and subjecting the surface layer thereof to multilayer coating of iron oxide or titanium oxide, thermochromic pigments, and photochromic particles can be used without limitation.

Examples of the dye include acid dyes such as Eosin, Phloxine, Water Yellow #6-C, Acid Red, Water Blue #105, Brilliant Blue FCF, and Nigrosine NB; direct dyes such as Direct Black 154, Direct Sky Blue 5B, and Violet BB; and basic dyes such as rhodamine and methyl violet.

Examples of the inorganic pigment include azo lake, insoluble azo pigments, chelate azo pigments, phthalocyanine pigments, perylene and perinone pigments. Specific examples include inorganic pigments such as carbon black, titanium black, zinc oxide, colcothar, aluminum, chromium oxide, iron black, cobalt blue, iron oxide yellow, viridian, zinc sulfide, lithopone, cadmium yellow, vermilion, cadmium red, chrome yellow, molybdate orange, zinc chromate, strontium chromate, white carbon, clay, talc, ultramarine blue, precipitated barium sulfate, barite powder, calcium carbonate, white lead, navy blue and white, Prussian blue, manganese violet, aluminum powder, and brass powder.

Examples of the organic pigment include C.I. Pigment Blue 17, C.I. Pigment Blue 15, C.I. Pigment Blue 17, C.I. Pigment Blue 27, C.I. Pigment Red 5, C.I. Pigment Red 22, C.I. Pigment Red 38, C.I. Pigment Red 48, C.I. Pigment Red 49, C.I. Pigment Red 53, C.I. Pigment Red 57, C.I. Pigment Red 81, C.I. Pigment Red 104, C.I. Pigment Red 146, C.I. Pigment Red 245, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 34, C.I. Pigment Yellow 55, C.I. Pigment Yellow 74, C.I. Pigment Yellow 95, C.I. Pigment Yellow 166, C.I. Pigment Yellow 167, C.I. Pigment Orange 5, C.I. Pigment Orange 13, C.I. Pigment Orange 16, C.I. Pigment Violet 1, C.I. Pigment Violet 3, C.I. Pigment Violet 19, C.I. Pigment Violet 23, C.I. Pigment Violet 50, and C.I. Pigment Green 7, and nitroso pigments.

These colorants may be used alone or in a combination of two or more (hereinafter, simply referred to as "at least one"). Furthermore, the average particle size of the inorganic pigments and the like is preferably 0.1 to 20 μm. In the present invention (including Examples and the like), "average particle size" is a value of D50 in the particle size distribution and can be measured by a particle size analyzer (MICROTRAC HRA9320-X100 (available from Nikkiso Co., Ltd.).

The content of the colorants can be appropriately increased and/or decreased based on the use and, in the present invention, as described below, the mass ratio of the solid content [(C)/(A)], where (C) is a mass of the colorant and (A) is a mass of the dispersing agent (A) to be used, is preferably 0.5 to 10, more preferably 1.0 to 6.0. In the usage form, the coloring tablet is preferably in an amount of 0.1 to 30 mass % (hereinafter, "mass %" is simply referred to as "%") with respect to the total amount of the ink composition.

The dispersing agent to be used in the present invention is at least one selected from the following Group A.

Group A: a hydroxide neutralization product of an (meth) acrylic resin, a hydroxide neutralization product of a styrene-maleic acid copolymer resin, a polyoxyethylene-based surfactant, an alkyl condensed ring sulfonate, an amine ethylene oxide (EO) propylene oxide (PO) adduct, and an isobutylene-based polymer.

The (meth)acrylic resin that can be used includes a resin formed of a polymer of one or a plurality of (meth)acrylic acid-based monomers, and a resin formed of a copolymer of an (meth)acrylic acid-based monomer and a vinyl-based monomer, and examples thereof include (meth)acrylic acid homopolymers, styrene-(meth)acrylic acid copolymers, (meth)acrylic acid-maleic acid copolymers, and (meth) acrylic acid-vinyl sulfonic acid copolymers. In the present invention, a neutralization product of (meth)acrylic resin by a hydroxide, such as sodium hydroxide or potassium hydroxide, is used.

Examples of the hydroxide neutralization products of (meth)acrylic resins include metal hydroxide neutralization products of styrene (meth)acrylic resins such as sodium hydroxide neutralization products of styrene (meth)acrylic resins and potassium hydroxide neutralization products of styrene (meth)acrylic resins. Examples of the commercially available products thereof include sodium hydroxide neutralization product of Joncryl 690 (available from BASF) and potassium hydroxide neutralization product of Joncryl 690 (available from BASF). A hydroxide neutralization product of a homopolymer of (meth)acrylic acid-based monomers can be also used. Examples of the commercially available product thereof include Joncryl JDX-C3000 (available from BASF) and AQUALIC DL, HL (available from Nippon Shokubai Co., Ltd.). A styrene acrylic acid copolymer resin XIRAN 1000, 2000, 3000, 4000, 6000, 9000, 3500, or 3600 (manufactured by Polyscope) neutralized and dissolved in an aqueous sodium hydroxide solution or an aqueous solution of potassium hydroxide can be used.

Examples of the hydroxide neutralization products of styrene-maleic acid copolymer resins include metal hydroxide neutralization products of styrene-maleic acid copolymer resins such as sodium hydroxide neutralized the styrene-maleic acid copolymer resin and potassium hydroxide neutralizers of the styrene-maleic acid copolymer resin.

Examples thereof include XIRAN 1000HNa, 2000HNa, 3000HNa (manufactured by Polyscope) which is an aqueous solution type of sodium salt of styrene-maleic acid copolymer resin, and XIRAN 1000HK, 2000HK, 3000HK (manufactured by Polyscpe) which is an aqueous solution type of potassium salt of styrene-maleic acid copolymer resin.

Furthermore, AQUALIC TL (available from Nippon Shokubai Co., Ltd.), which is a sodium hydroxide neutralization product of an (meth)acrylic acid-maleic acid copolymer, and AQUALIC GL (available from Nippon Shokubai Co., Ltd.), which is a sodium hydroxide neutralization product of an (meth)acrylic acid-vinyl sulfonic acid copolymer, can be also used. Meanwhile, an ammonia neutralization product of an (meth)acrylic resin does not exhibit the effects of the present invention due to ammonia volatilization over time.

As the polyoxyethylene-based surfactant, a polyoxyethylene-based nonionic surfactant can be preferably used. Examples of the polyoxyethylene-based nonionic surfactant include polyoxyethylene alkyl ether, polyoxyethylene oleyl ether, polyoxyethylene lauryl ether, polyoxyethylene alkylphenol ether, polyoxyethylene sorbitan monoester, polyoxyethylene higher alcohol ether, and polyoxyethylene polycyclic phenyl-based nonionic surfactants. From the perspective of further exhibiting the effects of the present invention, a polyoxyethylene polycyclic phenyl-based nonionic surfactant is preferred.

The polyoxyethylene polycyclic phenyl-based nonionic surfactant has two or more phenyl groups in a molecular backbone and has a structure in which ethylene oxide is added, and the phenyl group may have a substituent. The surfactant is produced by, for example, obtaining a bis form by subjecting distyrenated phenol to formalin condensation in the presence of formaldehyde, and then subjecting the ethylene oxide to addition polymerization in the presence of a catalyst.

As the polyoxyethylene polycyclic phenyl-based nonionic surfactant that can be used, those having the number of moles added of ethylene oxide of 10 to 120 are preferred. Examples thereof include polyoxyethylene distyrenated phenyl ether, polyoxyethylene distyrenated methylphenyl ether, and polyoxyethylene tristyrenated phenyl ether, and polyoxyethylene distyrenated phenyl ether is particularly preferred. Specific examples of the polyoxyethylene polycyclic phenyl-based nonionic surfactant include EMULGEN A-60, EMULGEN A-90, EMULGEN A-500, and EMULGEN B-66 (available from Kao Corporation), Newcol 703, Newcol 704, Newcol 706, and Newcol 707 (available from Nippon Nyukazai Co., Ltd.), and NOIGEN EA-87, NOIGEN EA-137, and NOIGEN EA-157 (available from DKS Co. Ltd.).

Examples of the alkyl condensed ring sulfonate that can be used include at least one such as sodium diisobutyl naphthalene sulfonate (e.g., PELEX NBL; available from Kao Corporation).

6

Examples of the amine ethylene oxide (EO) propylene oxide (PO) adduct that can be used include at least one such as ethylene oxide of 1,2-ethanediamine (number of moles added of EO is 0 to 1000)-propylene oxide (number of moles added of PO is 0 to 1000) adduct (e.g., Pluronic (trade name) TR701, TR702, TR704, and TR913R; available from Adeka Corporation).

Examples of the isobutylene-based polymer that can be used include at least one such as isobutylene maleic anhydride copolymers (e.g., ISOBAM: standard type #18, #10, #06, #04, and #600; available from Kuraray Co., Ltd.) or substances obtained by subjecting an isobutylene maleic anhydride copolymer to a treatment with sodium hydroxide or a pH adjuster (e.g., ammonia modified products, sodium hydroxide neutralization products, and substances treated with a pH adjuster: ISOBAM #110 and #104, available from Kuraray Co., Ltd.), and imides of isobutylene maleic anhydride copolymers (ISOBAM #310, #306, and #304, available from Kuraray Co., Ltd.).

These dispersing agents selected from Group A may be used alone or in a combination of two or more (hereinafter, simply referred to as "at least one").

The content of the dispersing agent can be appropriately increased or decreased based on the use and, from the perspectives of dispersion stability and dispersing efficiency, the mass ratio of the solid content [(C)/(A)], where (C) is a mass of the colorant and (A) is a mass of the dispersing agent (A) to be used, is preferably 0.5 to 10, and more preferably 1 to 8.

From the perspectives of providing reinforcing properties and solubility in a compatible manner to a higher degree and achieving antifouling properties when touched by hand, the coloring tablet of the present invention preferably further contains at least one reinforcing material selected from the following Group B.

Group B: a polyvinyl alcohol, a modified polyvinyl alcohol, polyvinylpyrrolidone, glycine betaine, urea, a sugar alcohol, latex, a polysaccharide, cellulose and titanium oxide.

The polyvinyl alcohol that can be used (hereinafter, simply abbreviated as "PVA") is a saponified product of polyvinyl acetate and can be represented by a general formula —[CH$_2$—CH(OH)]m-[CH$_2$—CH(OCOCH$_3$)]n-. In the present invention, from the perspective of mixing properties and dispersibility during production, the degree of saponification $\{[m/(m+n)]\times100\}$ is preferably 40 to 100 mol %. Specifically, as the PVA that can be used, a PVA having a suitable degree of saponification in the preferred range described above is selected from commercially available PVAs such as GOHSENOL A series, GOHSENOL G series, and GOHSENOL K series (commercial names of The Nippon Synthetic Chemical Industry Co., Ltd.) available from The Nippon Synthetic Chemical Industry Co., Ltd., POVAL J series (commercial name of Japan VAM & POVAL Co., Ltd.) available from Japan VAM & POVAL Co., Ltd., and KURARAY POVAL PVA series (commercial name of Kuraray Co., Ltd.) available from Kuraray Co., Ltd.

Furthermore, examples of the modified PVA that can be used include PVAs obtained by modifying a hydroxy group and an acetic acid group of each PVA to a modification group, such as a carboxyl group, sulfonic acid group, acetyl group, or ethylene oxide group, and PVAs in which a side chain has the modification group described above. Furthermore, a PVA-(meth)acrylic acid-methyl methacrylate copolymer, obtained by copolymerizing a partially saponified PVA and acrylic acid and methyl methacrylate, can be also used as the modified PVA of the present invention. In particular, use of a modified PVA of a partially saponified PVA having the degree of saponification of 40 to 90 mol % is preferred.

Specifically, as the modified PVA that can be used, a modified PVA having suitable degree of saponification and degree of polymerization is selected from commercially available modified PVAs such as GOHSENX L series and GOHSENX WO series (commercial names of The Nippon Synthetic Chemical Industry Co., Ltd.) available from Mitsubishi Chemical Corporation, anion-modified PVA (A series) (commercial name of Japan VAM & POVAL Co., Ltd.) available from Japan VAM & POVAL Co., Ltd., and EXCEVAL 1713 (commercial name of Kuraray Co., Ltd.) available from Kuraray Co., Ltd. Furthermore, as the PVA-acrylic acid-methyl methacrylate copolymer, a suitable PVA-acrylic acid-methyl methacrylate copolymer can be selected from POVACOAT (trade name of Daido Chemical Corporation) available from Daido Chemical Corporation.

As the polyvinylpyrrolidone, glycine betaine [$(CH_3)_2N^+(CH_3)CH_2COO^-$], and urea that can be used, commercially available products can be used.

Examples of the sugar alcohol that can be used include sugar alcohols including monosaccharide alcohols such as sorbitol, mannitol, xylitol, and erythritol, disaccharide alcohols such as isomaltitol, maltitol, and lactitol, trisaccharide alcohols such as maltotriitol, isomaltotriitol, and pinitol, and tetra- or higher saccharides such as oligosaccharide alcohol, and saccharified reduced starches and reduced starch decomposition products that are formed of these sugar alcohols.

As the latex to be used, use of an emulsion, which is a water dispersion of a known latex, such as homopolymer or copolymer, is preferred. Examples of the homopolymer include polymers such as vinyl acetate, vinyl chloride, styrene, methyl (meth)acrylate, butyl (meth)acrylate, methacrylonitrile, butadiene, and isoprene. Examples of the copolymer include ethylene-butadiene copolymers, styrene-butadiene copolymers, styrene-p-methoxystyrene copolymers, styrene-vinyl acetate copolymers, vinyl acetate-vinyl chloride copolymers, vinyl acetate-diethyl maleate copolymers, methyl methacrylate-acrylonitrile copolymers, methyl methacrylate-butadiene copolymers, methyl methacrylate-styrene copolymers, methyl methacrylate-vinyl acetate copolymers, methyl methacrylate-vinylidene chloride copolymers, methyl acrylate-acrylonitrile copolymers, methyl acrylate-butadiene copolymers, methyl acrylate-styrene copolymers, methyl (meth)acrylate-vinyl acetate copolymers, (meth)acrylic acid-butyl (meth)acrylate copolymers, methyl (meth)acrylate-vinyl chloride copolymers, butyl (meth)acrylate-styrene copolymers, ethylene vinyl chloride copolymers, polyester, and various polyurethane. Among these, styrene-based latex and styrene (meth)acrylic latex are preferably used. The average particle size of the latex is preferably 0.05 to 2.0 μm.

Examples of the polysaccharides that can be used include xanthan gum, guar gum, hydroxypropylated guar gum, casein, gum arabic, gelatin, amylose, agarose, agaropectin, arabinan, curdlan, callose, carboxymethyl starch, chitin, chitosan, quince seed, glucomannan, gellan gum, tamarind seed gum, dextran, nigeran, hyaluronic acid, pustulan, funoran, HM pectin, porphyran, laminaran, lichenan, carrageenan, alginic acid, tragacanth gum, alkasy gum, succinoglycan, locust bean gum, and tara gum. When commercially available products of these are available, such products can be also used.

Examples of the celluloses that can be used include crystalline celluloses, which are cellulose crystal aggregates each having a substantially fixed degree of polymerization, the cellulose crystal aggregate being obtained by subjecting cellulose to acid hydrolysis or alkaline hydrolysis. Examples of the commercially available products thereof include Ceolus RC-591, RC-N81, RC-591NF, and CL-611, and Ceolus Cream (available from Asahi Kasei Corporation), methyl cellulose, ethyl cellulose, hydroxyethyl cellulose, carboxymethyl cellulose, and sodium salts of these.

The reinforcing material selected from Group B can be used by blending at least one type thereof. Furthermore, the content of the reinforcing material is 0.1 to 60 mass %, and more preferably 0.5 to 20 mass %, with respect to the total amount of the coloring tablet from the perspectives of coloring characteristics and dispersibility.

In addition to the colorant, the dispersing agent, and the reinforcing material described above, the coloring tablet of the present invention can contain water (e.g., purified water, distilled water, ion exchanged water, pure water, the same applies hereinafter), excipients such as lactose, starch, dextrin, white sugar, precipitated silica, honey, rice starch, and traganth (in a case of a pill, the excipient also serves a role as a binding agent) at the time of pressing and solidifying into a tablet form, and organic solvents in an appropriate amount in the range as far as the effects of the present invention is not impaired, based on the form of the coloring tablet.

The coloring tablet of the present invention can be obtained in a desired form by, for example, a heat drying method, a vacuum drying method, an air drying method, a spray drying method, a vacuum freeze drying method (freeze drying method) or a tableting method, after kneading the components such as the colorant, the dispersing agent, and the reinforcing material, by using a kneader or the like.

In the freeze drying method, an aqueous mixture obtained by mixing the colorant, the dispersing agent, and the reinforcing material, and optionally the excipient is subject to freeze drying processing (freeze-vacuum drying). For example, an aqueous mixture is freeze-dried by using a vacuum freeze dryer to prepare a coloring tablet having a specific form.

Furthermore, in the tableting method, a composition obtained by mixing the colorant, the dispersing agent, and the reinforcing material, and optionally the excipient is heated to remove water in an open system at 50° C. for 48 hours, powderized using a mortar or the like, and then pressed and solidified to prepare a coloring tablet having a specific form.

From the perspective of handling and achieving a property that prevents the coloring tablet from crumbling during transport, the coloring tablet of the present invention preferably has a hardness of 0.02 kgf to 6.0 kgf, and more preferably 0.03 kgf to 3.0 kgf. Adjustment of the hardness to this range can be performed by adjusting the blended component amounts or adjusting the pressing pressure at the time of processing (forming) during the processing by the methods described above. In the present invention (including Examples and the like described below), the hardness can be measured by destructive testing.

The coloring tablet can be formed in any desired shape and size based on the ink type to be used as an ink for a writing instrument and a structure of the writing instrument (ballpoint pen, marking pen) to be used. For example, the coloring tablets can be formed in granular shapes such as spherical, hemispherical, cylindrical, polygonal, sheet-like, needle-like, donut-like, or macaroni-like shapes, preferably in spherical, hemispherical, cylindrical or macaroni-like shapes based on usability. The size thereof can be adjusted to, for example, the range of orthogonal axes of 1 mm×1 mm×1 mm (global diameter: 1 mm) to orthogonal axes of 10 mm×10 mm×10 mm (diameter: 10 mm), preferably orthogonal axes of 3 mm×3 mm×3 mm (diameter: 3 mm) to orthogonal axes of 7 mm×7 mm×7 mm (diameter: 7 mm) based on the ink type and the size of the writing instrument to be used.

Furthermore, to achieve a property that prevents hand or the like from being stained during handling, the coloring tablet surface may be coated with a water-soluble macro-molecule or subjected to steam processing.

By allowing the coloring tablet of the present invention having the composition described above to contain at least a colorant and a dispersing agent selected from the following Group A, the coloring tablet has highly excellent solubility and redispersibility.

The water-based ink composition for a writing instrument of the present invention is formed by at least dissolving or dispersing the coloring tablet having the composition described above in a liquid for ink that is a solvent.

As the liquid for ink to be used, water can be used as amain solvent, and from the perspectives of imparting water-holding capacity and enhancing touch of writing, a water-soluble solvent having the compatibility with water can be used as a solvent.

Examples of the water-soluble solvent that can be used include alcohols such as ethanol, isopropyl alcohol, n-butyl alcohol, ethylene glycol, diethylene glycol, and propylene glycol, amides such as formamide and derivatives thereof, sulfoxides such as dimethyl sulfoxide, and ethers such as ethylene glycol monomethyl ether, ethylene glycol monobutyl ether, ethylene glycol dibutyl ether, diethylene glycol monomethyl ether, diethylene glycol monoethyl ether, diethylene glycol monobutyl ether, diethylene glycol diethyl ether, diethylene glycol dibutyl ether, propylene glycol methyl ether, dipropylene glycol methyl ether, tripro-pylene glycol methyl ether, propylene glycol butyl ether, dipropylene glycol n-butyl ether, tripropylene glycol n-butyl ether, propylene glycol phenyl ether, ethyleneglycol mono-ethyl ether, ethylene glycol monohexyl ether, ethylene gly-col monophenyl ether, ethylene glycol mono-2-ethylbutyl ether, propylene glycol ethyl ether, and propylene glycol tert-butyl ether. One type of these, or a combination of two or more types of these can be used.

The content of the water-soluble solvent is 1 to 30%, and preferably 5 to 25%, with respect to the total amount of the ink composition.

In the water-based ink composition for a writing instru-ment of the present invention, as necessary, as components other than those described above, a colorant (e.g., pigments or dyes other than the coloring tablet described above) can be supplementarily added in combination with the coloring tablet described above, and additives (optional components) that are widely-used for water-based ink or the like can be further used, in a range that does not impair the effects of the present invention.

As the additives that can be used, examples of the pH adjuster include ammonia, urea, monoethanolamine, dietha-nolamine, triethanolamine, sodium carbonate, alkali metal salts of phosphoric acid such as sodium tripolyphosphate, and hydroxides of alkali metals such as sodium hydroxide. Examples of the corrosion inhibitor or fungicide include phenol, sodium omadine, pentachlorophenol sodium, 1,2-benzisothiazolin-3-one, 2,3,4,5-tetrachloro-4-(methylsulfo-nyl) pyridine, alkali metal salts of benzoic acid, such as sodium benzoate, of sorbitan acid, or of dehydroacetic acid, and benzimidazole-based compounds. Furthermore, as necessary, additives such as deterioration inhibitors or UV absorbers can be also blended.

The water-based ink composition for a writing instrument of the present invention can be easily prepared by dissolving or dispersing the coloring tablet having the composition described above in the liquid for ink that is a solvent by an ordinary method. The content of the coloring tablet at the time of preparation can be varied based on the preparation of the color of the ink, use of the writing instrument, and the like, and the content is approximately 0.1 to 30 mass % with respect to the total amount of the ink composition.

Furthermore, at the time of preparation of the ink com-position, for example, it is possible to prepare coloring tablets having multiple types of colors, then select a desired color among the prepared coloring tablets, and dissolve it or the like, or it is possible to enjoy mixing of colors in a freely-chosen combination.

By allowing the coloring tablets to have a single color or a mixed color of two or more colors that can be freely-chosen by a user, a water-based ink composition for a writing instrument that allows adjustment of the color of the ink based on the preference of the user or as necessary can be obtained.

For example, coloring tablets prepared by using three types of colorants that make the colors of the colorants of the coloring tablets red, blue, and yellow (cyan, magenta, and yellow) are prepared, and a plurality of coloring tablets may be prepared by measuring each of the coloring tablets. At this time, the user chooses two coloring tablets of a freely-chosen combination out of the three types of the coloring tablets. The chosen two coloring tablets and the liquid for ink are mixed and used. At this time, when the user chooses a red coloring tablet, the ink exhibits a red color. However, for example, a combination of coloring tablets of red and blue can produce a purple ink, and a combination of coloring tablets of red and yellow can produce an orange ink. When the number of colors of the coloring tablets that can be chosen is n, the number of colors that can be formed by choosing two of them is ($_nC_2$+n) if a combination of the same color is included. Furthermore, by increasing the number of coloring tablets that are mixed at once is increased to two or more, the number of colors that can be formed can be tremendously increased. Furthermore, by employing titanium oxide (selecting white) as the colorant of the coloring tablet, concealing properties can be imparted to the ink, for which the color is mixed.

According to the water-based ink composition for a writing instrument of the present invention, by at least dissolving or dispersing the coloring tablet having the com-position described above in the liquid for ink that is a solvent, which is described above, a water-based ink com-position for a writing instrument having various character-istics such as a freely-chosen color and concealing proper-ties as well as excellent solubility and redispersibility is obtained.

The prepared water-based ink composition for a writing instrument can be used in a known writing instrument, for example, by being filled in an ink container of a marking pen or a refill in a ballpoint pen, or can be used in a writing instrument having the following structure.

The writing instrument of the present invention contains the liquid for ink that is a solvent in a main body (including refill for a ballpoint pen) of the writing instrument such as a marking pen, and at the beginning of use, a colored ink is prepared by adding the coloring tablet(s) having the com-position described above into the liquid for ink, and the colored ink is led to a pen nib (e.g., ballpoint pen tip, fiber tip, felt tip, and plastic tip) provided at a tip of the main body of the writing instrument.

As the writing instrument of the embodiment described above, for example, a writing instrument (marking pen) having a liquid container that stores the liquid for ink and that has a detachable lid member, and a colored ink is prepared by adding the coloring tablet(s) having the composition described above into the liquid container by removing the lid to dissolve or disperse the coloring tablet(s), and writing by a pen nib can be performed by leading the colored ink to the pen nib (sintered core, fiber bundle) provided at a tip of the main body of the writing instrument. By use of the aqueous ink composition, the writing instrument of excellent solubility and redispersibility can be obtained.

EXAMPLES

Next, the present invention will be described in further detail using Examples 1 to 14 of the coloring tablets and Comparative Examples 1 to 5 and the like, but the present invention is not limited to the following examples and the like.

Examples 1 to 14 and Comparative Examples 1 to 5

According to the blending formulation listed in Table 1 below and the formation processing method described below, each coloring tablet was prepared. Hereinafter, "part" indicates part by mass, which indicates that the total is 100 parts (100 mass %).

For each of the obtained coloring tablets, hardness was measured by a destructive testing method by pressing by using an electric balance (available from Mettler). Solubility testing and redispersibility testing were also performed by the methods described below.

As the liquids for inks Y and Z that were used, those having the following compositions were used.

These results are shown in Table 1 and 2 below.

Freeze Drying Processing

After 20 parts of Pigment Blue 15 as a colorant, 6 parts of polyoxyethylene distyrenated phenyl ether (EMULGEN A90, available from Kao Corporation) as a dispersing agent, 1 part of crystalline cellulose as a reinforcing material, and 73 part of water were mixed adequately in an agate mortar and the mixture was put in a mold, freeze drying processing was performed by using a vacuum freeze dryer, and thus coloring tablets having a spherical shape and a diameter size of approximately 5 mm were obtained.

Pressure Forming Processing

After 20 parts of Pigment Red 122 as a colorant, 6 parts (in terms of solid content) of sodium hydroxide neutralization product of a styrene acrylic resin (Joncryl 690: 20% aqueous solution, available from BASF) as a dispersing agent, and 3 parts of xylitol (available from Wako Pure Chemical Industries, Ltd.) as a reinforcing material were sufficiently kneaded in an agate mortar, the mixture was dried and crushed again in an agate mortar. The mixture was put in a mold, pressure forming processing was performed by using a press machine, and thus a coloring tablet having a cylindrical shape and a size of 5 mm diameter×5 mm height was obtained.

Liquids for Ink: Y and Z

The coloring tablets were mixed with the liquid for ink: Y or Z having the compositions described below to prepare coloring inks. Liquid for ink Y: A mixed solvent that can be applied for a white ink for a marking pen 75 mass % of water (purified water), 5 mass % of water-soluble solvent (glycerin), and 20 mass % of (total) other components Liquid for ink Z: A mixed solvent that can be applied for a metallic silver ink for a marking pen 85 mass % of water (purified water), 5 mass % of water-soluble solvent (glycerin), and 10 mass % of (total) other components Solubility Testing The liquid for ink Y (or liquid for ink Z) and coloring tablets prepared in each of the Examples (or the Comparative Examples) were charged in an empty shaft in an inner part of a main body of a commercially available marking pen (available from Mitsubishi Pencil Co., Ltd.; commercial name: POSCA PC-5M), which was provided with a mechanism in which ink was pressed toward a pen nib when a pen nib was inserted into the marking pen body by the operation of pressing (pumping) the pen nib into the pen held vertical and the pen nib being inserted into the body.

The pen was shaken vertically for 50 times, then the marking pen was turned upside down and the ink composition in the shaft was taken out on a filter paper, and the undissolved remaining of the coloring tablet was visually evaluated based on the following evaluation criteria.

Evaluation Criteria:

A: No undissolved remaining was observed

B: Slight amount of undissolved remaining was observed

C: Dissolution did not occur

Redispersibility Testing

The liquid for ink Y (or liquid for ink Z) and coloring tablets prepared in each of the Examples (or the Comparative Examples) were charged in an empty shaft inside of a main body of a commercially available marking pen (available from Mitsubishi Pencil Co., Ltd.; commercial name: POSCA PC-5M), which was provided with a mechanism in which ink was pressed toward a pen nib when a pen nib was inserted into the marking pen body by the operation of pressing (pumping) the pen nib into the pen held vertical and the pen nib being inserted into the body.

The pen was shaken vertically for 50 times, and then the marking pen was allowed to stand in a state where the pen nib was facing down and stored still at 40° C. for 1 week. The marking pen was transferred to a room at 25° C. and cooled down for 1 hour by allowing the marking pen to stand still, and then the marking pen was shaken vertically for 30 times.

Thereafter, this marking pen was slid on a PPC paper surface, and in a case where the ink did not come out, pumping by which the pen nib was pressed inward was performed. This pumping operation was repeated until the ink reached the pen nib and started to flow out. The number of pumping was counted and evaluation was made based on the evaluation criteria described below. A case with a higher number of pumping was evaluated as easily causing clogging and exhibiting poor redispersibility.

Evaluation Criteria:

A: Once or more and less than 10 times of pumping

B: 10 times or more and less than 20 times of pumping

C: 20 times or more of pumping

*1 to *10 in Table 1 are the following commercially available products.

*1: EMULGEN A90, available from Kao Corporation

*2: Joncryl 690, available from BASF

*2A: XIRAN 2000HNa, available from Polyscope

*3: Joncryl 63J, available from BASF

*4: ISOBAM #04, available from Kuraray Co., Ltd.

*5: PELEX NBL, available from Kao Corporation

*6: Pluronic (registered trademark) TR701, available from Adeka Corporation

*7: Joncryl 678, available from BASF

*7A: Joncryl JDX-C3000, available from BASF

*7B: AQUALIC GL, available from Nippon Shokubai Co., Ltd.

*8: Ceolus RC591, available from Asahi Kasei Corporation

*8A: KC Flock W-50GK, available from Nippon Paper Co., Ltd.

*9: Xylitol, available from Wako Pure Chemical Industries, Ltd.

*10: PVP K30, available from Wako Pure Chemical Industries, Ltd.

*11: CR-50, available from Ishihara Sangyo Kaisha, Ltd.

As is clear from the results in Table 1, it was confirmed that the coloring tablets of Examples 1 to 14, which are in the range of the present invention, exhibited excellent solubility and redispersibility and provided these in a compatible manner to a higher degree, compared to Comparative Examples 1 to 5, which are outside of the range of the present invention.

INDUSTRIAL APPLICABILITY

The coloring tablet of the present invention can be suitably used in an ink composition for a writing instrument. The ink composition of the present invention can be suitably applied to applications such as felt-tip pens, marking pens, and ballpoint pens.

TABLE 1

| | | | Examples | | | | | | |
|---|---|---|---|---|---|---|---|---|---|
| | | | 1 | 2 | 3 | 4 | 5 | 6 | 7 |
| Colorant (C) | Pigment Blue 15 | | 20 | | | | | 20 | |
| | Pigment Red 122 | | | 20 | | | | | 20 |
| | Pigment Yellow 14 | | | | 20 | 20 | 20 | | |
| Dispersing agent (A) | Polyoxyethylene distyrenated phenyl ether | *1 | 6 | | | | | 6 | |
| | Sodium hydroxide neutralization product of styrene acrylic resin | *2 | | 6 | | | | | 18 |
| | Sodium hydroxide neutralization product of styrene-maleic acd resin | *2A | | | | | | | |
| | Ammonia neutralization product of styrene acrylic resin | *3 | | | | | | | |
| | Sodium hydroxide neutralization product of isobutylene maleic anhydride copolymer | *4 | | | 6 | | | | |
| | Alkyl condensed ring sulfonate | *5 | | | | 3 | | | |
| | Amine POEO adduct | *6 | | | | 3 | 3 | | |
| | Potassium hydroxide neutralization product of styrene acrylic resin | *7 | | | | | 3 | | |
| | Sodium hydroxide neutralization product of acrylic resin | | | | | | | | |
| | Acryl sulfonic acid resin | *7B | | | | | | | |
| Reinforcing material | Crystalline cellulose | *8 | 1 | | | | 5 | | |
| | Powdery cellulose | *8A | | | | | | | |
| | Xylitol | *9 | | 3 | | | | | 2 |
| | Polyvinylpyrrolidone | *10 | | | 1 | | | | |
| | Titanium Oxide | *11 | | | | | | | |
| Mass ratio (C)/(A) | | | 3.33 | 3.33 | 3.33 | 3.33 | 3.33 | 3.33 | 1.11 |
| Formation method | F: freeze drying P: pressing formation | | F | P | F | F | F | P | F |
| Coloring tablet | Shape | | Spherical | Cylindrical | Spherical | Spherical | Spherical | Cylindrical | Spherical |
| | Size (mm) | | φ 5 | φ 5 × h 5 | φ 5 | φ 5 | φ 5 | φ 5 × h 5 | φ 5 |
| Hardness | (kgf) | | 0.05 | 0.2 | 0.08 | 0.1 | 0.03 | 0.02 | 0.04 |
| Evaluation | Liquid for ink | | Y | Y | Y | Y | Z | Y | Y |
| | Solubility | | A | A | A | A | A | A | A |
| | Redispersibility | | A | A | A | A | A | A | A |

| | | | | | | | | (Mass amount) |
|---|---|---|---|---|---|---|---|---|
| | | | | | Examples | | | |
| | | | 8 | 9 | 10 | 11 | 12 | 13 | 14 |
| Colorant (C) | Pigment Blue 15 | | | | | 20 | | 20 | 20 |
| | Pigment Red 122 | | | | | | 20 | | |
| | Pigment Yellow 14 | | 20 | 20 | 20 | | | | |
| Dispersing agent (A) | Polyoxyethylene distyrenated phenyl ether | *1 | | | | | | | |
| | Sodium hydroxide neutralization product of styrene acrylic resin | *2 | | | | | 3 | | |
| | Sodium hydroxide neutralization product of styrene-maleic acd resin | *2A | | | | | | 6 | 6 |
| | Ammonia neutralization product of styrene acrylic resin | *3 | | | | | | | |
| | Sodium hydroxide neutralization product of isobutylene maleic anhydride copolymer | *4 | 2 | | | | | | |

TABLE 1-continued

| | | Ref | | | | | | | |
|---|---|---|---|---|---|---|---|---|---|
| | Alkyl condensed ring sulfonate | *5 | | 3 | | | | | |
| | Amine POEO adduct | *6 | | 3 | 3 | | | | |
| | Potassium hydroxide neutralization product of styrene acrylic resin | *7 | | | 3 | | | | |
| | Sodium hydroxide neutralization product of acrylic resin | *7A | | | | 6 | | | |
| | Acryl sulfonic acid resin | *7B | | | | | 3 | | |
| Reinforcing material | Crystalline cellulose | *8 | | 5 | | | | | |
| | Powdery cellulose | *8A | | | | | | | 2 |
| | Xylitol | *9 | | | 2 | | | | |
| | Polyvinylpyrrolidone | *10 | 1 | | | 1 | | | |
| | Titanium Oxide | *11 | | | | | 20 | | |
| Mass ratio (C)/(A) | | | 10 | 3.33 | 3.33 | 3.33 | 3.33 | 3.33 | 3.33 |
| Formation method | F: freeze drying P: pressing formation | | P | P | P | P | P | F | F |
| Coloring tablet | Shape | | Cylindrical | Cylindrical | Macaroni-like | Cylindrical | Cylindrical | Hemi-spherical | Hemi-spherical |
| | Size (mm) | | φ 5 × h 5 | φ 5 × h 5 | φ 5 × h 5 | φ 5 × h 5 | φ 5 × h 5 | φ 6 × h 4 | φ 6 × h 4 |
| Hardness | (kgf) | | 2 | 0.08 | 0.08 | 0.05 | 0.2 | 1.0 | 0.6 |
| Evaluation | Liquid for ink | | Y | Y | Z | Y | Y | Y | Y |
| | Solubility | | A | A | A | A | A | A | A |
| | Redispersibility | | A | A | A | A | A | A | A |

TABLE 2

| | | Ref | Comparative Examples (Mass amount) | | | | |
|---|---|---|---|---|---|---|---|
| | | | 1 | 2 | 3 | 4 | 5 |
| Colorant (C) | Pigment Blue 15 | | 20 | | | | |
| | Pigment Red 122 | | | 20 | | | |
| | Pigment Yellow 14 | | | | 20 | 20 | 20 |
| Dispersing agent (A) | Polyoxyethylene distyrenated phenyl ether | *1 | | | | | |
| | Sodium hydroxide neutralization product of styrene acrylic resin | *2 | | | | | |
| | Sodium hydroxide neutralization product of styrene-maleic acd resin | *2A | | | | | |
| | Ammonia neutralization product of styrene acrylic resin | *3 | 6 | 40 | 6 | 6 | 1 |
| | Sodium hydroxide neutralization product of isobutylene maleic anhydride copolymer | *4 | | | | | |
| | Alkyl condensed ring sulfonate | *5 | | | | | |
| | Amine POEO adduct | *6 | | | | | 1 |
| | Potassium hydroxide neutralization product of styrene acrylic resin | *7 | | | | | |
| | Sodium hydroxide neutralization product of acrylic resin | *7A | | | | | |
| | Acryl sulfonic acid resin | *7B | | | | | |
| Reinforcing material | Crystalline cellulose | *8 | 5 | | | 5 | |
| | Powdery cellulose | *8A | | | | | |
| | Xylitol | *9 | | 2 | | | |
| | Polyvinylpyrrolidone | *10 | | | 5 | | |
| | Titanium Oxide | *11 | | | | | |
| Mass ratio (C)/(A) | | | 3.33 | 0.5 | 3.33 | 3.33 | 10 |
| Formation method | F: freeze drying P: pressing formation | | F | F | P | P | P |
| Coloring tablet | Shape | | Spherical | Spherical | Cylindrical | Cylindrical | Cylindrical |
| | Size (mm) | | φ 5 | φ 5 | φ 5 × h 5 | φ 5 × h 5 | φ 5 × h 5 |
| Hardness | (kgf) | | 0.05 | 0.05 | 0.05 | 1 | 0.01 |
| Evaluation | Liquid for ink | | Y | Y | Y | Y | Y |
| | Solubility | | C | C | C | C | C |
| | Redispersibility | | C | C | C | C | C |

The invention claimed is:

1. A coloring tablet, comprising:
a colorant; and
a dispersing agent comprising a hydroxide neutralization product of an (meth)acrylic acid resin, a hydroxide neutralization product of a styrene-maleic acid copolymer resin, a polyoxyethylene-based surfactant, an alkyl condensed ring sulfonate, an amine ethylene oxide propylene oxide adduct, and/or an isobutylene-based polymer, wherein the coloring tablet has a hardness in a range of from 0.02 kgf to 6.0 kgf.

2. The coloring tablet of claim 1, wherein a C/A mass ratio is in a range of from 0.5 to 10, where C is a mass of the colorant, and A is a mass of the dispersing agent.

3. The coloring tablet of claim 1, further comprising:

a reinforcing material comprising a polyvinyl alcohol, a modified polyvinyl alcohol, polyvinylpyrrolidone, glycine betaine, urea, a sugar alcohol, latex, a polysaccharide, a cellulose, and/or a titanium oxide.

4. The coloring tablet of claim 1, having a hardness in a range of from 0.03 kgf to 3.0 kgf.

5. The coloring tablet of claim 1, having a granule shape.

6. A water-based ink composition for a writing instrument, the water-based ink composition comprising:

the coloring tablet of claim 1, wherein the coloring tablet is dissolved in a liquid for ink.

7. A preparation method of a water-based ink composition for a writing instrument, the method comprising:

dissolving or dispersing the coloring tablet of claim 1 in a liquid for ink.

8. The coloring tablet of claim 1, wherein the dispersing agent is at least one selected from the group consisting of a hydroxide neutralization product of an (meth)acrylic acid resin, a hydroxide neutralization product of a styrene-maleic acid copolymer resin, a polyoxyethylene-based surfactant, an alkyl condensed ring sulfonate, an amine ethylene oxide propylene oxide adduct, and an isobutylene-based polymer.

9. The coloring tablet of claim 1, wherein the reinforcing material is at least one selected from the group consisting of a polyvinyl alcohol, a modified polyvinyl alcohol, polyvinylpyrrolidone, glycine betaine, urea, a sugar alcohol, latex, a polysaccharide, a cellulose and a titanium oxide.

10. The coloring tablet of claim 1, further comprising:

a polyvinyl alcohol and/or a modified polyvinyl alcohol.

11. The coloring tablet of claim 1, further comprising:

polyvinylpyrrolidone.

12. The coloring tablet of claim 1, further comprising:

glycine betaine and/or urea.

13. The coloring tablet of claim 1, further comprising:

a sugar alcohol and/or a polysaccharide.

14. The coloring tablet of claim 1, further comprising:

a cellulose and/or a titanium oxide.

15. The coloring tablet of claim 1, wherein the dispersing agent comprises the hydroxide neutralization product of an (meth)acrylic acid resin.

16. The coloring tablet of claim 1, wherein the dispersing agent comprises the hydroxide neutralization product of a styrene-maleic acid copolymer resin.

17. The coloring tablet of claim 1, wherein the dispersing agent comprises the polyoxyethylene-based surfactant.

18. The coloring tablet of claim 1, wherein the dispersing agent comprises the alkyl condensed ring sulfonate.

19. The coloring tablet of claim 1, wherein the dispersing agent comprises the amine ethylene oxide propylene oxide adduct.

20. The coloring tablet of claim 1, wherein the dispersing agent comprises the isobutylene-based polymer.

* * * * *